US012568937B2

(12) United States Patent
Wilkinson

(10) Patent No.: US 12,568,937 B2
(45) Date of Patent: Mar. 10, 2026

(54) SYSTEM AND METHOD FOR TRACING MEMBERS OF AN ANIMAL POPULATION

(71) Applicant: ALLFLEX AUSTRALIA PTY. LTD, Queensland (AU)

(72) Inventor: Benjamin Thomas John Wilkinson, Redland Bay (AU)

(73) Assignee: ALLFLEX AUSTRALIA PTY. LTD, Queensland (AU)

( * ) Notice: Subject to any disclaimer, the term of this patent is extended or adjusted under 35 U.S.C. 154(b) by 0 days.

(21) Appl. No.: 18/721,446

(22) PCT Filed: Dec. 29, 2022

(86) PCT No.: PCT/IB2022/062873
§ 371 (c)(1),
(2) Date: Jun. 18, 2024

(87) PCT Pub. No.: WO2023/126869
PCT Pub. Date: Jul. 6, 2023

(65) Prior Publication Data
US 2025/0049002 A1    Feb. 13, 2025

(30) Foreign Application Priority Data
Dec. 30, 2021    (IL) ........................................ 289512

(51) Int. Cl.
| *A01K 29/00* | (2006.01) |
| *A01K 11/00* | (2006.01) |
| *H04W 4/02* | (2018.01) |
| *H04W 4/021* | (2018.01) |
| *H04W 4/029* | (2018.01) |

(52) U.S. Cl.
CPC .......... *A01K 29/005* (2013.01); *A01K 11/006* (2013.01); *H04W 4/021* (2013.01); *H04W 4/025* (2013.01); *H04W 4/029* (2018.02)

(58) Field of Classification Search
CPC .... A01K 29/005; A01K 11/006; A01K 11/00; H04W 4/029; H04W 4/025; H04W 4/021
See application file for complete search history.

(56) References Cited

U.S. PATENT DOCUMENTS

| 7,843,350 | B2 | 11/2010 | Geissler et al. | |
| 9,195,866 | B1 | 11/2015 | Mehranfar et al. | |
| 10,905,105 | B2 * | 2/2021 | Crouthamel | ......... A01K 29/005 |
| 11,109,571 | B2 * | 9/2021 | Harvey | .................. G06F 18/24 |

(Continued)

*Primary Examiner* — John A Tweel, Jr.
(74) *Attorney, Agent, or Firm* — Keith O'Doherty

(57) ABSTRACT

A system for tracing a Group of Members (GoM) of an animal population throughout a process including moving the GoM between a plurality of Physically Separate Locations (PSLs), the system comprising a processing circuitry configured to: obtain a plurality of sets of identifiers of the GoM, each obtained by readings of Identification Devices (IDs), wherein (a) each ID of the IDs is attached to, and uniquely identifies, a respective member of the GoM, (b) the identifiers in each of the sets are read (i) at a respective given PSL of the PSLs, (ii) by a respective given ID reader of a plurality of ID readers; (c) one or more partial sets of the sets do not include one or more respective missing identifiers of at least one member of the GoM; and add the missing identifiers to the respective partial sets along with a confidence score.

15 Claims, 4 Drawing Sheets

(56)     References Cited

U.S. PATENT DOCUMENTS

| | | | |
|---|---|---|---|
| 11,910,784 B2 * | 2/2024 | Shmigelsky | G06Q 10/06 |
| 11,960,957 B2 * | 4/2024 | Mitchell | A01K 11/006 |
| 12,099,893 B2 * | 9/2024 | Kreuscher | G06K 7/10366 |
| 2007/0044732 A1 | 3/2007 | Araki et al. | |
| 2017/0202185 A1 | 7/2017 | Trumbull et al. | |
| 2020/0125849 A1 | 4/2020 | Labrecque et al. | |

* cited by examiner

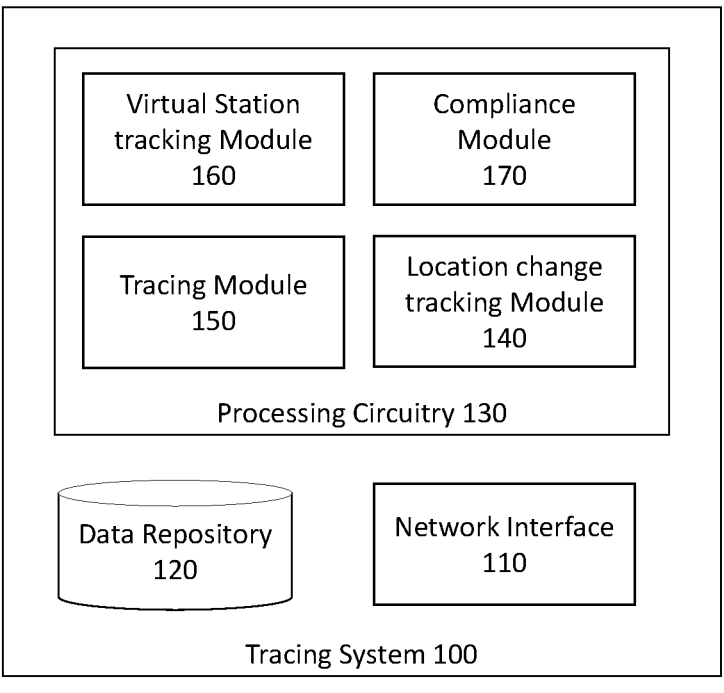

| Virtual Station tracking Module 160 | Compliance Module 170 |
| Tracing Module 150 | Location change tracking Module 140 |

Processing Circuitry 130

Data Repository 120

Network Interface 110

Tracing System 100

Fig. 2

200 obtain a reading of the given member's identification device attached to, and uniquely identifying, the given member, the reading acquired by the identification device reader located at the respective distinct physically separate location    210 insert a location change record to the data repository, indicating that the given member arrived at, or departed from, the distinct physically separate location, the location change record including an indication of an arrival time of the given member to the respective distinct physically separate location or the departure time of the given member from the respective distinct physically separate location, thereby enabling tracing the members throughout the process    220

Fig. 3

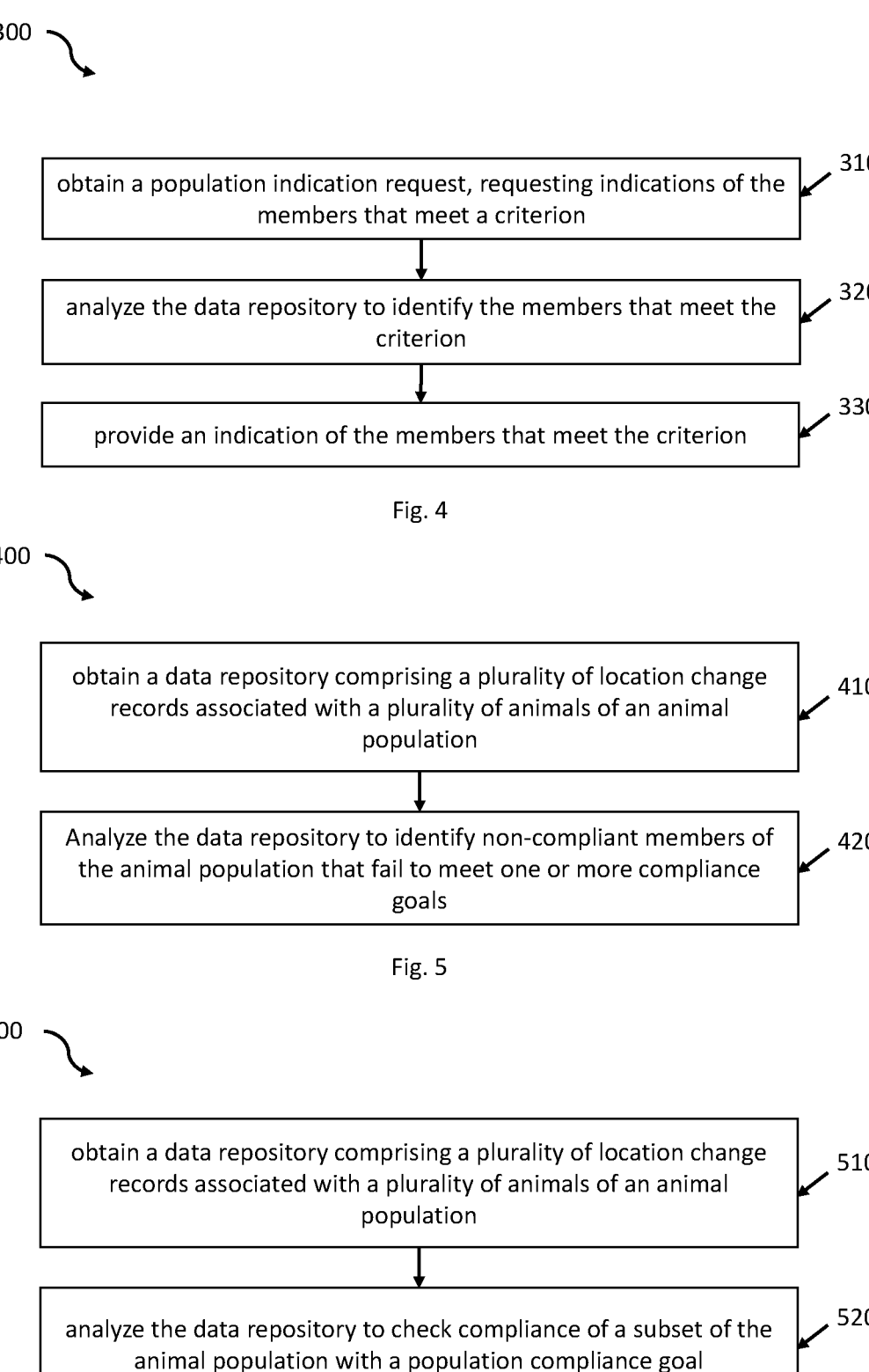

300 obtain a population indication request, requesting indications of the members that meet a criterion — 310 analyze the data repository to identify the members that meet the criterion — 320 provide an indication of the members that meet the criterion — 330

Fig. 4

400 obtain a data repository comprising a plurality of location change records associated with a plurality of animals of an animal population — 410

Analyze the data repository to identify non-compliant members of the animal population that fail to meet one or more compliance goals — 420

Fig. 5

500 obtain a data repository comprising a plurality of location change records associated with a plurality of animals of an animal population — 510 analyze the data repository to check compliance of a subset of the animal population with a population compliance goal — 520

Fig. 6

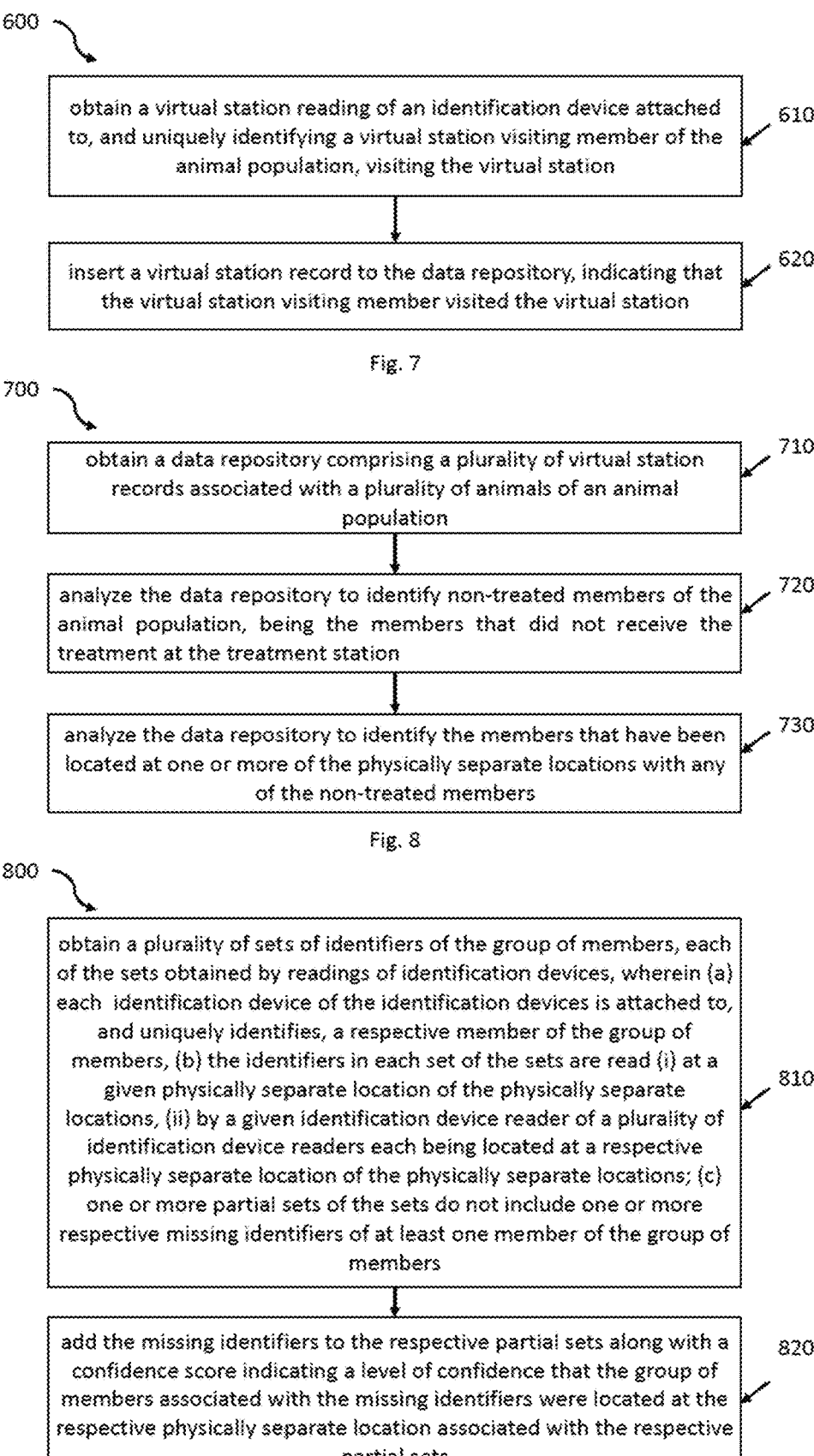

600 obtain a virtual station reading of an identification device attached to, and uniquely identifying a virtual station visiting member of the animal population, visiting the virtual station — 610 insert a virtual station record to the data repository, indicating that the virtual station visiting member visited the virtual station — 620

Fig. 7

700 obtain a data repository comprising a plurality of virtual station records associated with a plurality of animals of an animal population — 710 analyze the data repository to identify non-treated members of the animal population, being the members that did not receive the treatment at the treatment station — 720 analyze the data repository to identify the members that have been located at one or more of the physically separate locations with any of the non-treated members — 730

Fig. 8

800 obtain a plurality of sets of identifiers of the group of members, each of the sets obtained by readings of identification devices, wherein (a) each identification device of the identification devices is attached to, and uniquely identifies, a respective member of the group of members, (b) the identifiers in each set of the sets are read (i) at a given physically separate location of the physically separate locations, (ii) by a given identification device reader of a plurality of identification device readers each being located at a respective physically separate location of the physically separate locations; (c) one or more partial sets of the sets do not include one or more respective missing identifiers of at least one member of the group of members — 810 add the missing identifiers to the respective partial sets along with a confidence score indicating a level of confidence that the group of members associated with the missing identifiers were located at the respective physically separate location associated with the respective partial sets — 820

Fig. 9

SYSTEM AND METHOD FOR TRACING MEMBERS OF AN ANIMAL POPULATION

TECHNICAL FIELD

The presently disclosed subject matter relates to animal traceability, and more specifically to a system and method for tracing members of an animal population.

BACKGROUND

In many cases, animals are moved or transferred between various physically separate locations, whether on the same premise (e.g. between separate areas within a farm) or between premises (e.g. between farms). In some cases, the animals are moved between stations such as saleyards, processing plants, quarantine areas, slaughter houses, etc. In some cases, part of the stations may be located in different countries which requires the animals to be shipped between such locations (e.g. via sea, air or land). In many cases, various regulations exist that define various requirements that relate to animals that are being moved or transferred. Such regulations may vary between different states or countries, different animal types, different intended usages of the animal, etc. In order to determine compliance with the regulatory requirements—having knowledge of the animals' locations over time is a prerequisite.

In addition, in many cases it is desirable to have the ability to determine physical encounters between animals based on their locations. This may be desirable for example in order to break down a chain of infection. In such case, when a certain animal is identified as sick, having the knowledge of those animals that may have been infected from it is valuable. Such knowledge may prevent the need of terminating an entire animal population (e.g. all animal on a certain farm, all animal in a certain shipment, etc.). In addition, such knowledge can save on treatment and vaccination costs (e.g. by improving vaccination records, or by preventing spreading of diseases thereby reducing needed treatments), enable faster and more accurate tracking of disease origins (e.g. by enabling identifying shipments and/or individual animals and associating those with countries of origin, for example if an outbreak occurs there), and enable tracking "patient zero" (e.g. for study purposes).

In order to trace animals as they move between various locations, the animals have to be identified. The identification can be made using an identification (ID) device (such as, but not limited to, an ID tag such as an EID tag) attached to the animal, or using any other type of electronic identification, visual identification, camera-based identification, facial or body part recognition, barcode, identification marks, etc.

Irrespectively of the animal identification technique used, in some cases the accuracy of the animal identification is limited and some animals may not be successfully identified although an attempt is made to identify them at a certain location. In such cases, it may be challenging to trace the locations of the animals whose identification failed in one or more locations between which they are moved.

There is thus a real need in the art for a new system and method for tracing members of an animal population.

GENERAL DESCRIPTION

In accordance with a first aspect of the presently disclosed subject matter, there is provided a system for tracing members of an animal population throughout a process including moving at least some of the members, between (a) a plurality of physically separate locations and (b) one or more virtual stations, in a given order, the system comprising: a plurality of identification devices, each being attached to, and uniquely identifying, a respective member of the members; a plurality of identification device readers, each capable of being located at a respective physically separate location of the physically separate locations, and each capable of reading the identification devices to uniquely identify the respective member; a data repository comprising one or more records, each of the records (i) being associated with a respective member of the members, and (ii) including a unique animal identifier associated with the identification device attached to, and uniquely identifying, the respective member of the members; and a processing circuitry configured to perform the following: (A) upon any given member of the members arriving at any of the physically separate locations, or departing from any of the physically separate locations: obtain a reading of the given member's identification device attached to, and uniquely identifying, the given member, the reading acquired by the identification device reader located at the respective distinct physically separate location; and insert a location change record to the data repository, indicating that the given member arrived at, or departed from, the distinct physically separate location, the location change record including an indication of an arrival time of the given member to the respective distinct physically separate location or the departure time of the given member from the respective distinct physically separate location, thereby enabling tracing the members throughout the process; and (B) upon any given member of the members visiting any of the virtual stations: obtain a virtual station reading of an identification device attached to, and uniquely identifying a virtual station visiting member of the animal population, visiting the virtual station; and insert a virtual station record to the data repository, indicating that the virtual station visiting member visited the virtual station.

In one embodiment of the presently disclosed subject matter and/or embodiments thereof, (a) a given identification device reader of the identification device readers is associated with at least two of the physically separate locations, and (b) an association of each reading acquired by the given identification device reader with a distinct physically separate location of the physically separate locations is performed based on the given order.

In one embodiment of the presently disclosed subject matter and/or embodiments thereof, each virtual station reading is obtained using a respective manual identification device reader associated with the virtual station.

In one embodiment of the presently disclosed subject matter and/or embodiments thereof, (a) the process includes moving at least some of the members between a plurality of virtual stations, (b) a given manual identification device reader is associated with at least two of the virtual stations, and (c) an association of each virtual station reading acquired by the given manual identification device reader with a distinct virtual station of the virtual stations is performed based on the given order.

In one embodiment of the presently disclosed subject matter and/or embodiments thereof, the processing circuitry is further configured to: obtain a population indication request, requesting indications of the members that meet a criterion; analyze the data repository to identify the members that meet the criterion; provide an indication of the members that meet the criterion.

In one embodiment of the presently disclosed subject matter and/or embodiments thereof, the criterion depends on a location of the members.

In one embodiment of the presently disclosed subject matter and/or embodiments thereof, the criterion depends on the location of the members with respect to one or more indicated members of the members.

In one embodiment of the presently disclosed subject matter and/or embodiments thereof, the indicated members are indicated as being sick or as being directly or indirectly associated with a sick member of the members.

In one embodiment of the presently disclosed subject matter and/or embodiments thereof, the processing circuitry is further configured to analyze the data repository to identify non-compliant members of the animal population, wherein (a) the arrival time indicated by one or more of the location change records associated with the non-compliant members fails to meet an arrival time criterion, (b) the departure time indicated by one or more of the location change records associated with the non-compliant members fails to meet a departure time criterion, (c) a stay time lapsing between the arrival time of any given non-compliant member of the non-compliant members to a given distinct physically separate location of the distinct physically separate locations and the departure time of the given non-compliant member from the given distinct physically separate location as indicated by the location change records associated with non-compliant members fails to meet a stay time criterion, or (d) the one or more of the location change records associated with the non-compliant members indicate that the non-compliant members skipped one or more of the plurality of physically separate locations.

In one embodiment of the presently disclosed subject matter and/or embodiments thereof, regulatory requirements define one or more of (a) the arrival time criterion, (b) the departure time criterion, or (c) the stay time criterion.

In one embodiment of the presently disclosed subject matter and/or embodiments thereof, the regulatory requirements are configurable.

In one embodiment of the presently disclosed subject matter and/or embodiments thereof, the regulatory requirements are location specific, so that the regulatory requirements in a first distinct physically separate location of the distinct physically separate locations is different than the regulatory requirements in a second distinct physically separate location of the distinct physically separate locations.

In one embodiment of the presently disclosed subject matter and/or embodiments thereof, the regulatory requirements are determined according to a destination location of the physically separate locations, being a destination location of the animal population.

In one embodiment of the presently disclosed subject matter and/or embodiments thereof, the regulatory requirements are determined according to a type of the animal population.

In one embodiment of the presently disclosed subject matter and/or embodiments thereof, the processing circuitry is further configured to analyze the data repository to check compliance of a subset of the animal population with a population compliance goal, wherein the subset comprising a plurality of the members.

In one embodiment of the presently disclosed subject matter and/or embodiments thereof, (a) the virtual station is a treatment station and, (b) the virtual station visiting member receives treatment at the treatment station, and (c) the virtual station record indicates that the treatment receiving member received the treatment.

In one embodiment of the presently disclosed subject matter and/or embodiments thereof, the processing circuitry is further configured to analyze the data repository to identify non-treated members of the animal population, being the members that did not receive the treatment at the treatment station.

In one embodiment of the presently disclosed subject matter and/or embodiments thereof, the processing circuitry is further configured to analyze the data repository to identify the members that have been located at one or more of the physically separate locations with any of the non-treated members.

In one embodiment of the presently disclosed subject matter and/or embodiments thereof, the processing circuitry is further configured to analyze the data repository to check compliance of a subset of the animal population with a population compliance goal associated with the treatment, wherein the subset comprising a plurality of the members.

In one embodiment of the presently disclosed subject matter and/or embodiments thereof, the non-treated members are the members that did not receive the treatment at the treatment station before moving to a subsequent physically separate location of the physically separate locations.

In one embodiment of the presently disclosed subject matter and/or embodiments thereof, the virtual station reading is obtained by a treatment provider located at the treatment station.

In one embodiment of the presently disclosed subject matter and/or embodiments thereof, at least two of the physically separate locations are located at distinct geographical locations.

In one embodiment of the presently disclosed subject matter and/or embodiments thereof, the identification devices are Electronic Identification Devices (EIDs).

In one embodiment of the presently disclosed subject matter and/or embodiments thereof, the process is selected from a plurality of processes, each defined by a user of the system, and each defining respective process stations, the process stations including a subset of the plurality of physically separate locations, and at least one of the virtual stations, between which the respective animal population is to be moved in a given order.

In one embodiment of the presently disclosed subject matter and/or embodiments thereof, at least two of the processes define respective process stations that partially overlap.

In accordance with a second aspect of the presently disclosed subject matter, there is provided a method for tracing members of an animal population throughout a process including moving at least some of the members between, (a) a plurality of physically separate locations and (b) one or more virtual stations, in a given order, the method comprising: providing: (a) a plurality of identification devices, each being attached to, and uniquely identifying, a respective member of the members; (b) a plurality of identification device readers, each capable of being located at a respective physically separate location of the physically separate locations, and each capable of reading the identification devices to uniquely identify the respective member; and (c) a data repository comprising one or more records, each of the records (i) being associated with a respective member of the members, and (ii) including a unique animal identifier associated with the identification device attached to, and uniquely identifying, the respective member of the members; and performing the following: (A) upon any given member of the members arriving at any of the physically separate locations, or departing from any of the physically separate locations: obtaining a reading of the given member's identification device attached to, and uniquely identifying, the given member, the reading acquired by the identification device reader located at the respective distinct physically separate location; and inserting a location change record to the data repository, indicating that the given member arrived at, or departed from, the distinct physically separate location, the location change record including an indication of an arrival time of the given member to the respective distinct physically separate location or the departure time of the given member from the respective distinct physically separate location, thereby enabling tracing the members throughout the process; and (B) upon any given member of the members visiting any of the virtual stations: obtaining a virtual station reading of an identification device attached to, and uniquely identifying a virtual station visiting member of the animal population, visiting the virtual station; and inserting a virtual station record to the data repository, indicating that the virtual station visiting member visited the virtual station.

In one embodiment of the presently disclosed subject matter and/or embodiments thereof, (a) a given identification device reader of the identification device readers is associated with at least two of the physically separate locations, and (b) an association of each reading acquired by the given identification device reader with a distinct physically separate location of the physically separate locations is performed based on the given order.

In one embodiment of the presently disclosed subject matter and/or embodiments thereof, each virtual station reading is obtained using a respective manual identification device reader associated with the virtual station.

In one embodiment of the presently disclosed subject matter and/or embodiments thereof, (a) the process includes moving at least some of the members between a plurality of virtual stations, (b) a given manual identification device reader is associated with at least two of the virtual stations, and (c) an association of each virtual station reading acquired by the given manual identification device reader with a distinct virtual station of the virtual stations is performed based on the given order.

In one embodiment of the presently disclosed subject matter and/or embodiments thereof, the method further comprises: obtaining a population indication request, requesting indications of the members that meet a criterion; analyzing the data repository to identify the members that meet the criterion; providing an indication of the members that meet the criterion.

In one embodiment of the presently disclosed subject matter and/or embodiments thereof, the criterion depends on a location of the members.

In one embodiment of the presently disclosed subject matter and/or embodiments thereof, the criterion depends on the location of the members with respect to one or more indicated members of the members.

In one embodiment of the presently disclosed subject matter and/or embodiments thereof, the indicated members are indicated as being sick or as being directly or indirectly associated with a sick member of the members.

In one embodiment of the presently disclosed subject matter and/or embodiments thereof, the method further comprises analyzing the data repository to identify non-compliant members of the animal population, wherein (a) the arrival time indicated by one or more of the location change records associated with the non-compliant members fails to meet an arrival time criterion, (b) the departure time indicated by one or more of the location change records associated with the non-compliant members fails to meet a departure time criterion, (c) a stay time lapsing between the arrival time of any given non-compliant member of the non-compliant members to a given distinct physically separate location of the distinct physically separate locations and the departure time of the given non-compliant member from the given distinct physically separate location as indicated by the location change records associated with non-compliant members fails to meet a stay time criterion, or (d) the one or more of the location change records associated with the non-compliant members indicate that the non-compliant members skipped one or more of the plurality of physically separate locations.

In one embodiment of the presently disclosed subject matter and/or embodiments thereof, regulatory requirements define one or more of (a) the arrival time criterion, (b) the departure time criterion, or (c) the stay time criterion.

In one embodiment of the presently disclosed subject matter and/or embodiments thereof, the regulatory requirements are configurable.

In one embodiment of the presently disclosed subject matter and/or embodiments thereof, the regulatory requirements are location specific, so that the regulatory requirements in a first distinct physically separate location of the distinct physically separate locations is different than the regulatory requirements in a second distinct physically separate location of the distinct physically separate locations.

In one embodiment of the presently disclosed subject matter and/or embodiments thereof, the regulatory requirements are determined according to a destination location of the physically separate locations, being a destination location of the animal population.

In one embodiment of the presently disclosed subject matter and/or embodiments thereof, the regulatory requirements are determined according to a type of the animal population.

In one embodiment of the presently disclosed subject matter and/or embodiments thereof, the method further comprises analyzing the data repository to check compliance of a subset of the animal population with a population compliance goal, wherein the subset comprising a plurality of the members.

In one embodiment of the presently disclosed subject matter and/or embodiments thereof, (a) the virtual station is a treatment station and, (b) the virtual station visiting member receives treatment at the treatment station, and (c) the virtual station record indicates that the treatment receiving member received the treatment.

In one embodiment of the presently disclosed subject matter and/or embodiments thereof, the method further comprises analyzing the data repository to identify non-treated members of the animal population, being the members that did not receive the treatment at the treatment station.

In one embodiment of the presently disclosed subject matter and/or embodiments thereof, the method further comprises analyzing the data repository to identify the members that have been located at one or more of the physically separate locations with any of the non-treated members.

In one embodiment of the presently disclosed subject matter and/or embodiments thereof, the method further comprises analyzing the data repository to check compliance of a subset of the animal population with a population compliance goal associated with the treatment, wherein the subset comprising a plurality of the members.

In one embodiment of the presently disclosed subject matter and/or embodiments thereof, the non-treated members are the members that did not receive the treatment at the treatment station before moving to a subsequent physically separate location of the physically separate locations.

In one embodiment of the presently disclosed subject matter and/or embodiments thereof, the virtual station reading is obtained by a treatment provider located at the treatment station.

In one embodiment of the presently disclosed subject matter and/or embodiments thereof, at least two of the physically separate locations are located at distinct geographical locations.

In one embodiment of the presently disclosed subject matter and/or embodiments thereof, the identification devices are Electronic Identification Devices (ETDs).

In one embodiment of the presently disclosed subject matter and/or embodiments thereof, the process is selected from a plurality of processes, each defined by a user of the system, and each defining respective process stations, the process stations including a subset of the plurality of physically separate locations, and at least one of the virtual stations, between which the respective animal population is to be moved in a given order.

In one embodiment of the presently disclosed subject matter and/or embodiments thereof, at least two of the processes define respective process stations that partially overlap.

In accordance with a third aspect of the presently disclosed subject matter, there is provided a non-transitory computer readable storage medium having computer readable program code embodied therewith, the computer readable program code, executable by at least one processing circuitry of a computer to perform a method for tracing members of an animal population throughout a process including moving at least some of the members between, (a) a plurality of physically separate locations and (b) one or more virtual stations, in a given order, the method comprising: providing: (a) a plurality of identification devices, each being attached to, and uniquely identifying, a respective member of the members; (b) a plurality of identification device readers, each capable of being located at a respective physically separate location of the physically separate locations, and each capable of reading the identification devices to uniquely identify the respective member; and (c) a data repository comprising one or more records, each of the records (i) being associated with a respective member of the members, and (ii) including a unique animal identifier associated with the identification device attached to, and uniquely identifying, the respective member of the members; and performing the following: (A) upon any given member of the members arriving at any of the physically separate locations, or departing from any of the physically separate locations: obtaining a reading of the given member's identification device attached to, and uniquely identifying, the given member, the reading acquired by the identification device reader located at the respective distinct physically separate location; and inserting a location change record to the data repository, indicating that the given member arrived at, or departed from, the distinct physically separate location, the location change record including an indication of an arrival time of the given member to the respective distinct physically separate location or the departure time of the given member from the respective distinct physically separate location, thereby enabling tracing the members throughout the process; and (B) upon any given member of the members visiting any of the virtual stations:

obtaining a virtual station reading of an identification device attached to, and uniquely identifying a virtual station visiting member of the animal population, visiting the virtual station; and inserting a virtual station record to the data repository, indicating that the virtual station visiting member visited the virtual station.

In accordance with a fourth aspect of the presently disclosed subject matter, there is provided a system for tracing a group of members of an animal population throughout a process including moving the group of members between a plurality of physically separate locations in a given order, the system comprising a processing circuitry configured to: obtain a plurality of sets of identifiers of the group of members, each of the sets obtained by readings of identification devices, wherein (a) each identification device of the identification devices is attached to, and uniquely identifies, a respective member of the group of members, (b) the identifiers in each set of the sets are read (i) at a respective given physically separate location of the physically separate locations, (ii) by a respective given identification device reader of a plurality of identification device readers each being located at a respective physically separate location of the physically separate locations; (c) one or more partial sets of the sets do not include one or more respective missing identifiers of at least one member of the group of members; and add the missing identifiers to the respective partial sets along with a confidence score indicating a level of confidence that the group of members associated with the missing identifiers were located at the respective physically separate location associated with the respective partial sets.

In one embodiment of the presently disclosed subject matter and/or embodiments thereof, the identifiers of the group of members are sequential and wherein the missing identifiers are added to the respective partial lists if the missing identifiers meet a missing identifiers addition rule.

In one embodiment of the presently disclosed subject matter and/or embodiments thereof, the missing identifiers addition rule is that at least one of an immediately preceding identifier, preceding the respective missing identifiers, or an immediately subsequent identifier, subsequent to the respective missing identifiers, is included in the respective partial list.

In one embodiment of the presently disclosed subject matter and/or embodiments thereof, the confidence score is associated with a number of past readings of the missing identifiers prior to reading the respective partial set, so that the larger the number of past readings the higher the confidence score is.

In one embodiment of the presently disclosed subject matter and/or embodiments thereof, upon a given set of the sets including one or more given missing identifiers of the missing identifiers, missing from another set of the sets that is acquired at a given physically separate location of the physically separate locations that is located before the physically separate location of the physically separate locations in which the given set was obtained in accordance with the given order, the confidence score associated with given missing identifiers is increased to indicate maximal assumed confidence.

In one embodiment of the presently disclosed subject matter and/or embodiments thereof, at least two of the physically separate locations are located at distinct geographical locations.

In one embodiment of the presently disclosed subject matter and/or embodiments thereof, the identification devices are Electronic Identification Devices (EIDs).

In accordance with a fifth aspect of the presently disclosed subject matter, there is provided a method for tracing a group of members of an animal population throughout a process including moving the group of members between a plurality of physically separate locations in a given order, the method comprising: obtaining, by a processing circuitry, a plurality of sets of identifiers of the group of members, each of the sets obtained by readings of identification devices, wherein (a) each identification device of the identification devices is attached to, and uniquely identifies, a respective member of the group of members, (b) the identifiers in each set of the sets are read (i) at a respective given physically separate location of the physically separate locations, (ii) by a respective given identification device reader of a plurality of identification device readers each being located at a respective physically separate location of the physically separate locations; (c) one or more partial sets of the sets do not include one or more respective missing identifiers of at least one member of the group of members; and adding, by the processing circuitry, the missing identifiers to the respective partial sets along with a confidence score indicating a level of confidence that the group of members associated with the missing identifiers were located at the respective physically separate location associated with the respective partial sets.

In one embodiment of the presently disclosed subject matter and/or embodiments thereof, the identifiers of the group of members are sequential and wherein the missing identifiers are added to the respective partial lists if the missing identifiers meet a missing identifiers addition rule.

In one embodiment of the presently disclosed subject matter and/or embodiments thereof, the missing identifiers addition rule is that at least one of an immediately preceding identifier, preceding the respective missing identifiers, or an immediately subsequent identifier, subsequent to the respective missing identifiers, is included in the respective partial list.

In one embodiment of the presently disclosed subject matter and/or embodiments thereof, the confidence score is associated with a number of past readings of the missing identifiers prior to reading the respective partial set, so that the larger the number of past readings the higher the confidence score is.

In one embodiment of the presently disclosed subject matter and/or embodiments thereof, upon a given set of the sets including one or more given missing identifiers of the missing identifiers, missing from another set of the sets that is acquired at a given physically separate location of the physically separate locations that is located before the physically separate location of the physically separate locations in which the given set was obtained in accordance with the given order, the confidence score associated with given missing identifiers is increased to indicate maximal assumed confidence.

In one embodiment of the presently disclosed subject matter and/or embodiments thereof, at least two of the physically separate locations are located at distinct geographical locations.

In one embodiment of the presently disclosed subject matter and/or embodiments thereof, the identification devices are Electronic Identification Devices (EIDs).

In accordance with a sixth aspect of the presently disclosed subject matter, there is provided a non-transitory computer readable storage medium having computer readable program code embodied therewith, the computer readable program code, executable by at least one processing circuitry of a computer to perform a method for tracing a group of members of an animal population throughout a process including moving the group of members between a plurality of physically separate locations in a given order, the method comprising: obtaining, by a processing circuitry, a plurality of sets of identifiers of the group of members, each of the sets obtained by readings of identification devices, wherein (a) each identification device of the identification devices is attached to, and uniquely identifies, a respective member of the group of members, (b) the identifiers in each set of the sets are read (i) at a respective given physically separate location of the physically separate locations, (ii) by a respective given identification device reader of a plurality of identification device readers each being located at a respective physically separate location of the physically separate locations; (c) one or more partial sets of the sets do not include one or more respective missing identifiers of at least one member of the group of members; and adding, by the processing circuitry, the missing identifiers to the respective partial sets along with a confidence score indicating a level of confidence that the group of members associated with the missing identifiers were located at the respective physically separate location associated with the respective partial sets.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which:

FIG. 2 is a block diagram schematically illustrating one example of a tracing system for tracing members of an animal population, in accordance with the presently disclosed subject matter;

FIG. 3 is a flowchart illustrating one example of a sequence of operations carried out for tracking location changes of animals, in accordance with the presently disclosed subject matter;

FIG. 4 is a flowchart illustrating one example of a sequence of operations carried out for tracing animals, in accordance with the presently disclosed subject matter;

FIG. 5 is a flowchart illustrating one example of a sequence of operations carried out for checking compliance of animals with compliance goals, in accordance with the presently disclosed subject matter;

FIG. 6 is a flowchart illustrating one example of a sequence of operations carried out for checking compliance of an animal population with compliance goals, in accordance with the presently disclosed subject matter;

FIG. 7 is a flowchart illustrating one example of a sequence of operations carried out for tracking visits of animals at virtual stations, in accordance with the presently disclosed subject matter;

FIG. 8 is a flowchart illustrating one example of a sequence of operations carried out for checking compliance of animals with virtual stations compliance goals, in accordance with the presently disclosed subject matter; and FIG. 9 is a flowchart illustrating one example of a sequence of operations carried out for dealing with incomplete sets of animal identifiers, in accordance with the presently disclosed subject matter.

DETAILED DESCRIPTION

Figure 1:
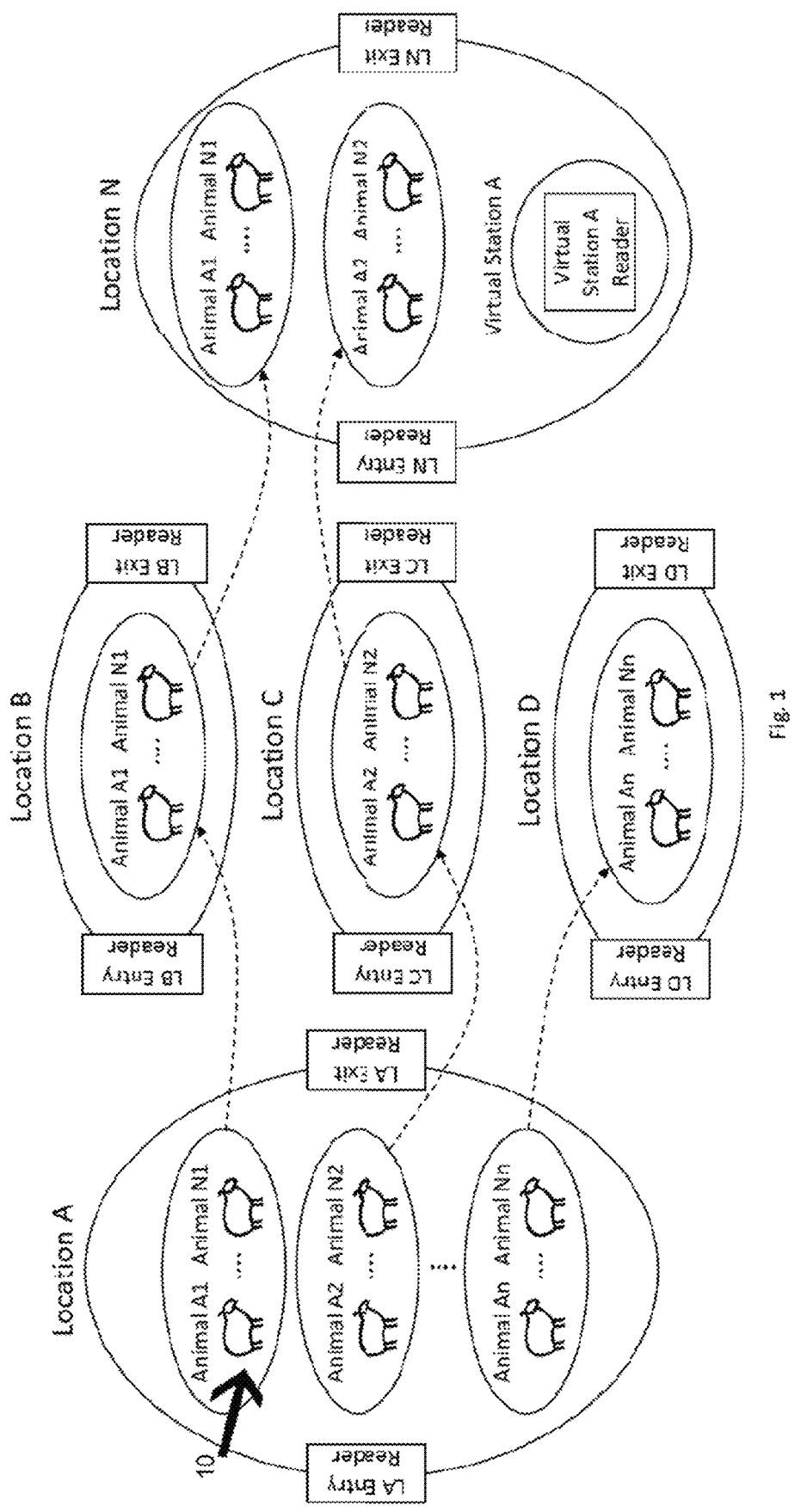
FIG. 1 is a schematic illustration of a system for tracing members of an animal population, in accordance with the presently disclosed subject matter.

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures, and components have not been described in detail so as not to obscure the presently disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "obtaining", "inserting", "analyzing", "providing", "adding" or the like, include action and/or processes of a computer that manipulate and/or transform data into other data, said data represented as physical quantities, e.g. such as electronic quantities, and/or said data representing the physical objects. The terms "computer", "processor", "processing circuitry" and "controller" should be expansively construed to cover any kind of electronic device with data processing capabilities, including, by way of non-limiting example, a personal desktop/laptop computer, a server, a computing system, a communication device, a smartphone, a tablet computer, a smart television, a processor (e.g. digital signal processor (DSP), a microcontroller, a field programmable gate array (FPGA), an application specific integrated circuit (ASIC), etc.), a group of multiple physical machines sharing performance of various tasks, virtual servers co-residing on a single physical machine, any other electronic computing device, and/or any combination thereof.

The operations in accordance with the teachings herein may be performed by a computer specially constructed for the desired purposes or by a general-purpose computer specially configured for the desired purpose by a computer program stored in a non-transitory computer readable storage medium. The term "non-transitory" is used herein to exclude transitory, propagating signals, but to otherwise include any volatile or non-volatile computer memory technology suitable to the application.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus, the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

In embodiments of the presently disclosed subject matter, fewer, more and/or different stages than those shown in FIGS. 3 to 9 may be executed. In embodiments of the presently disclosed subject matter one or more groups of stages illustrated in FIGS. 3 to 9 may be executed simultaneously. FIGS. 1 and 2 illustrates a general schematic of the system architecture in accordance with an embodiment of the presently disclosed subject matter. Each module in FIGS. 1 and 2 can be made up of any combination of software, hardware and/or firmware that performs the functions as defined and explained herein.

The modules in FIGS. 1 and 2 may be centralized in one location or dispersed over more than one location, as detailed herein. In other embodiments of the presently disclosed subject matter, the system may comprise fewer, more, and/or different modules than those shown in FIGS. 1 and 2.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Bearing this in mind, attention is drawn to FIG. 1, which is a schematic illustration of a system for tracing members of an animal population, in accordance with the presently disclosed subject matter.

In accordance with the example illustrated in the figure, a plurality of Locations are shown, namely Location A, Location B, Location C, Location D, . . . , Location N (N being an integer). It is to be noted that the number of locations shown in the illustration is arbitrarily chosen, and any other number of locations greater than one (including thousands or even hundreds of thousands of locations or more) can exist. In certain embodiments, the locations may be physically separate, so that animals that are located at a given location cannot freely move between different locations in accordance with their own free will. Movement of animals between locations may be a controlled process, for example a process that can be controlled by humans and/or machinery (e.g. smart gates that can be controlled by a suitable gate control device such as a computer). Moving an animal includes moving the animal by making it walk between different locations (e.g. between different parts of a farm, noting that the different parts are physically separate and the animals cannot freely move between them), or transferring it between locations (e.g. between farms, domestically or internationally) via a transportation vehicle by land (e.g. using trucks or other suitable vehicles), air e.g. (using airplanes) or sea (e.g. using ships).

The animals are moved between the locations as part of a process. The process can begin at animal birth, or at any later time (e.g. after the animal is tagged by attaching an Electronic Identification (EID) tag that uniquely identified the animal to the animal, or upon arrival of the animal to a given location of the physically separate location in which it is identified and recorded in the system for tracing members of an animal population as further detailed herein). The process can end when the animal arrives at a certain location following which there is no need to continue to trace the animal (e.g. slaughter). During the process, animal movements or transferers between the locations are tracked and recorded for various purposes as further detailed herein.

It is to be noted that various transportation means can also be locations. For example, a transportation means (e.g. a ship, a truck, an airplane, a trailer, etc.) used to transport animals between locations can be regarded as a location itself.

Further in the illustration, a certain animal population is shown to be present in location A. Although the animal 10 in the illustration is illustrated as a sheep, it is by no means limiting, and the animal 10 can be any other animal (e.g. other types of cattle, pets, fish, livestock, etc.), or a combination of various types of animals. The animal population includes a plurality of animals, marked in the illustration as (a) Animal A1, . . . , Animal N1 (N1 being an integer), (b) Animal A2, . . . , Animal N2 (N2 being an integer), (c) . . . , (n) Animal An, . . . , Animal Nn (n and Nn being integers). According to the illustration, the animal processing begins at Location A, however this is by no means limiting, and the animal processing can begin at another location, or at a plurality of additional or alternative locations.

In accordance with the illustration shown in FIG. 1, a first group of animals (namely Animal A1, . . . , Animal N1) is moved to location B, a second group of animals (namely Animal A2, . . . , Animal N2) is moved to location C, and a third group of animals (namely Animal A3, . . . , Animal N3) is moved to location D. It is to be noted that although in the illustration all animals are transferred from Location A to other locations, this is by no means limiting, and some of the animals can remain at Location A and not be moved therefrom to another location. It is to be further noted that in some cases some of the animal that are shown to be located at Location A may originate from other locations from which they have been transferred to Location A. It is to be still further noted that in some cases, although not shown in the illustration, additional animals may be present at Locations B, C and D other than the animals that have been transferred thereto from Location A as shown by the illustration. Such additional animals may originate from Location A, or from any other location.

Looking further at the illustration, it can be appreciated that (a) the animals that have been moved from Location A to Location B (namely Animal A1, . . . , Animal N1) are then moved from Location B to Location N, and (b) the animals that have been moved from Location A to Location C (namely Animal A2, . . . , Animal N2) are then moved from Location C to Location N. It is to be noted that although the illustration shows that the animals are moved directly from Location B to Location N, or from Location C to Location N (i.e. without passing through intermediate locations), this is by no means limiting and the animals can pass through intermediary locations between Locations B or C and Location N.

In order to enable tracking animals between the locations as part of their processing (optionally in real-time or near-real time, e.g. in very short intervals of times, close to instantaneous, or within up to a few seconds), it is required to have the ability to identify them at least once within the location. For example, each animal can be identified upon arrival at each location and/or upon departure from each location and/or at any given time between arrival and departure from each location.

In a certain example, animals are identified upon arrival and upon departure from each location. In such case, each animal that enters a given location has to be identified, and its entry into the given location has to be recorded. Similarly, each animal that leaves a given location has to be identified, and its departure from the given location has to be recorded. For this purpose, each of the physically separate locations includes a respective entry reader and exit reader. The entry readers are configured to identify animals that are entering the respective location, and the exit readers are configured to identify animals that are exiting the respective location. Looking at the illustration: (a) LA entry reader is the entry reader associated with Location A and LA exit reader is the exit reader associated with Location A, (b) LB entry reader is the entry reader associated with Location B and LB exit reader is the exit reader associated with Location B, (c) LC entry reader is the entry reader associated with Location C and LC exit reader is the exit reader associated with Location C, (d) LD entry reader is the entry reader associated with Location D and LD exit reader is the exit reader associated with Location D, . . . , (n) LN Each of the entry readers is configured to uniquely identify each animal that enters the respective location, and each of the exit readers is configured to uniquely identify each animal that exists the respective location. It is to be noted that the entry readers and/or the exit readers can be manual readers (operated by a user), stationary readers (e.g. monitoring passage of animal through a gate), autonomously driven readers (e.g. carried by autonomous drones), readers incorporated into a mobile device, computer, etc.

For this purpose, in some cases, the animals can have an identification (ID) device (such as, but not limited to, an ID tag such as an EID tag) attached thereto (not shown). The ID device can be a tag that uniquely identifies the animal to which it is attached. However, the ID device may alternatively be another type of device used to identify the animal by any of the methods or systems described herein (including electronic identification, visual identification, camera-based identification, facial or body part recognition, barcode, identification marks, etc.). When read by suitable reading device (e.g. any of the entry readers and/or exit readers), the ID device returns a reading that includes at least a unique animal identifier, uniquely identifying the animal to which it is attached. As discussed, each animal can be identified using various systems/devices/methods/techniques, including an ID tag, identification marks (e.g. digits, letters, symbols, or any combination thereof, etc.), readable barcodes, facial (or other body parts) recognition, etc.

In other cases, all, or part of the animals can be identified without having an ID device attached thereto. One example is visual identification (e.g. facial, or other body parts, recognition). In such cases, the reading devices can be visual reading device such as a camera that acquires images based on which the animals are identified.

It is to be noted that in some cases, one or more of the identification methods may be passive identification methods, such as passive tags. For example, the tags can be a printing of a certain identifier on the animal to be identified, or they can be stickers of a certain visual identifier attached to the animal to be identified, or they can be markings painted on the animal to be identified. In such cases, where the tags are visually identifiable (e.g. barcodes), the respective tag reading device can be, for example, a camera capable of acquiring images in the spectrum of the visual tags.

Returning to the illustration, it is to be noted that the animals are tracked during their processing (optionally in real-time or near-real time). All of the animals that are shown to be located at Location A have been identified upon entering Location A using the LA entry reader (e.g. by reading an ID tag attached to the animals, or using a visual identification, or using any other system and/or identification method). In the specific non-limiting example in which the animals are identified both upon arrival to and upon departure from each location: (a) when the Animals have been identified upon entry to Location A, an indication of their entry into Location A, along with their respective entry time of entering Location A is stored on a data repository (as further detailed herein), and (b) upon each of the animals exiting Location A, it is identified using LA exit reader (e.g. by reading an ID tag attached to the animals, or using a visual identification, or using any other system and/or identification method), an indication of their exit of Location A, along with their respective exit time of exiting Location A is stored on the data repository (as further detailed herein). A similar process occurs at each of the locations:

When animals arrive at location B, they are identified using LB entry reader, and their entry, including the entry time is recorded in the data repository. When animals exit location B, they are identified using LB exit reader, and their exit, including the exit time is recorded in the data repository.

When animals arrive at location C, they are identified using LC entry reader, and their entry, including the entry time is recorded in the data repository. When animals exit location C, they are identified using LC exit reader, and their exit, including the exit time is recorded in the data repository.

When animals arrive at location D, they are identified using LD entry reader, and their entry, including the entry time is recorded in the data repository. When animals exit location D, they are identified using LD exit reader, and their exit, including the exit time is recorded in the data repository.

When animals arrive at location N, they are identified using LN entry reader, and their entry, including the entry time is recorded in the data repository. When animals exit location N, they are identified using LN exit reader, and their exit, including the exit time is recorded in the data repository.

Those records that are stored on the data repository when an animal enters or exists a location are also referred to herein as "location change records".

It is to be noted that in some cases, the entry reader and the exit reader can be the same reader. In such cases, the single reader used to identify the animals when they are arriving and exiting a given location can optionally operate in a first operation mode for identifying arriving animals and a second operation mode for identifying departures. Alternatively, a computerized system can be used in order to discriminate between entries and exits of the animals, using programmed logic. It is to be further noted that in some cases only one of the animal entry time or exit time is tracked (or alternatively instead of the animal entry time or the animal exit time, an indication of an arbitrary time between arrival and departure from each location can be stored, which can also be used to indicate that the animal was processed at such location), and in such cases a single device reader can be used to acquire only a single reading of an animal passing through the respective location. Such configuration however, by itself, may not enable determining a stay time of the animal at the respective location, which is useful information. That said, using a single reader along with an additional sensor (e.g. a video camera) can complement the information obtained by the reader with additional information, such as whether the identified animal is arriving at, or departing from, the location.

Looking at Location N, it can be seen that within the location a virtual station exists, namely Virtual Station A. A virtual station is a station in which all, or some, of the animals are required to pass while staying at a given location. Virtual Station A is a station in which all, or some, of the animals that arrive at location N are required to pass as part of their processing. For example, in some cases, any animal that arrives at Location N has to be vaccinated. The vaccination can be provided at Virtual Station A, within Location N, without the need to move the animal to another location for vaccination. In such cases, the animals can be identified by Virtual Station A Reader, which is configured to uniquely identify the animals that that are being processed at Virtual Station A. Virtual Station A Reader can be a manual identification device reader operated by a human operator, such as a veterinarian for example.

When an animal is processed or arrives at Virtual Station A, it is identified using Virtual Station A reader (e.g. by reading an ID tag attached to the animals, or using a visual identification, or using any other system and/or identification method). When the Animals have been identified upon being processed at Virtual Station A, a suitable indication, along with the processing time is stored on the data repository (as further detailed herein). Those records that are stored on the data repository when an animal is processed at a virtual location are also referred to herein as "virtual station records".

It is to be noted that at least some of the entry readers and/or exit readers (also interchangeably referred to herein as "identification device readers") may be uncapable of identifying each animal that enters or leaves the respective location. This inability may be caused by various reasons, including, for example, misplacement of the ID device attached to some of the animals, inability to differentiate between a plurality of ID devices that are scanned simultaneously (e.g. more than one animal simultaneously passes through a gate in which such entry/exit reader/s are located), malfunction of the ID device attached to one or more animals, malfunction of the entry/exit reader/s, human error (e.g. a human operator of a manual reader fails to read an ID device attached to one or more animals), etc. There is a need to address the inaccuracies which result from the fact that in some cases not all animals are correctly identified at each station/scanning point. One example of such a process and system is provided herein, with reference to FIG. 9.

Having described the process of tracing animal populations, it is to be noted that the information that is acquired and stored on the data repository can be used for additional purposes. Some exemplary usages of the data indicative of location changes of the animals include determining the animal welfare (as described in co-pending Patent Application No. 280744 filed in Israel on Feb. 9, 2021), health score, and/or other Key Performance Indicators (KPIs). For example, the time of travel, the type of transportation used, the treatments applied to the animal, and many other parameters can have an effect on the animal welfare. Similarly, the types of treatment and treatment times of the animal can have an effect on the animal health score. Furthermore, information indicative of proximity of an animal to another animal that has been identified as being sick can also have an effect on the animal health score, and so on.

It is to be noted that a user of the system can define, e.g. via a user interface, different processes for different parts of the animal population. Each process defines, for its respective part of the animal population, respective process stations including a subset of the plurality of physically separate locations, and optionally at least one of the virtual stations, between which the respective animal population is to be moved—in a given order. Looking at the figure, the user can define (A) a first process which includes moving Animal A1 to N1 from Location A to Location B, from Location B to Location N, and within Location N to Virtual Station A, (B) a second process which includes moving Animal A2 to N2 from Location A to Location C, from Location C to Location N, and within Location N to Virtual Station A, (C) a third process which includes moving Animal An to Nn from Location A to Location D, or any other process that includes moving animals between process stations (including various physically separate locations and/or virtual stations). Such processes that are defined by the user can be configurable.

In some cases, some of the processes that are defined by the user can partially overlap. When looking at the figure, all processes shown therein partially overlap, as all processes start at Location A. The first process and the second process both end at Location C (or at Virtual Station A). However, all three processes also have a non-overlapping portion: the first process includes moving Animal A1 to N1 via Location B which is not included in the second process, nor in the third process; the second process includes moving Animal A2 to N2 via Location C which is not included in the first process, nor in the third process; the third process includes moving Animal An to Nn to Location D which is not included in the first process, nor in the second process. It is to be noted that in some cases no overlap exists between at least one pair of processes (although not shown in the figure).

In some cases, as part of the definition of the process, the user can also define goals for completion of transfers between process stations. The system can be configured to monitor compliance with such goals, as further detailed herein. It is to be noted that in some cases the goals can be defined by the user based on various regulatory requirements.

Each process station is associated with at least one identification device reader that is used to read the identification device of the animals that pass at the respective process station (be it a physically separate location or a virtual station). In the illustrated example: Location A is associated with LA Entry Reader and LA Exit Reader; Location B is associated with LB Entry Reader and LB Exit Reader; Location C is associated with LC Entry Reader and LC Exit Reader; Location D is associated with LD Entry Reader and LD Exit Reader; Location N is associated with LN Entry Reader and LN Exit Reader; and Virtual Station A is associated with Virtual Station A Reader.

In some cases, a single identification device reader can be associated with a plurality of process stations. For example, LA Exit Reader can be the same identification device reader as LB Entry Reader. Similarly, a single manual identification device reader can be associated with more than one virtual station.

In such cases, where a single identification device reader can be associated with a plurality of process stations, the association of each reading acquired by such identification device reader with the respective process station can be performed based on the order in which the animals are planned to pass through the various process stations as defined by the process (as defined by the user). For example, if the process defines that the Animals A1 to N1 are to be transferred from Location A to Location B, and according to the process Animals A1 to N1 are currently located at Location A, once the identification device reader that is used as both the LA Exit Reader and LB Entry Reader reads the tags of Animals A1 to N1, both an indication that Animals A1 to N1 left Location A and an indication that Animals A1 to N1 entered Location B can be updated in the data repository (in respective location change record/s). In another example, if the process defines that Animals A1 to N1 are required to visit Virtual Station A and afterwards Virtual Station B (not shown in the figure) while in Location N, a single manual identification device reader can be used to read the tags of Animals A1 to N1 when visiting Virtual Stations A and B. In view of the fact that the process defines that the Animals A1 to N1 are required to visit Virtual Station A before Virtual Station B, the first readings obtained from Animals A1 to N1 can be associated with a visit at Virtual Station A and the later readings obtained from Animals A1 to N1 can be associated with a visit at Virtual Station B.

Having described the general process of data collection, attention is now drawn to FIG. 2. FIG. 2 is a block diagram schematically illustrating one example of a tracing system for tracing members of an animal population, in accordance with the presently disclosed subject matter.

Tracing system 100 comprises a network interface 110 (e.g. a network card, a WiFi client, a LiFi client, 3G/4G client, or any other component), enabling tracing system 100 to communicate over a network with external systems from which it obtains information of animal movements and/or animal locations. The external systems can be the entry/exit/virtual station readers themselves, or any other intermediate system(s) that obtain the information about the progress of the animals in their processing (e.g. computerized systems that manage each of the locations and directly communicate with the entry/exit readers).

Tracing system 100 further comprises, or is otherwise associated with, a data repository 120 (e.g. a database, a storage system, a memory including Read Only Memory—ROM, Random Access Memory—RAM, or any other type of memory, etc.) configured to store data, optionally including, inter alia, animal location change records and/or animal virtual station records. Each location change record is associated with a respective distinct animal and can include an indication of a location into which the animal entered or from which the animal exited or in which the animal was processed, and an indication of a corresponding time for either an exit, entrance or processing. Data repository 120 can be further configured to enable retrieval and/or update and/or deletion of the stored data.

It is to be noted that in some cases, data repository 120 can be distributed, while the tracing system 100 has access to the information stored thereon, e.g. via a wired or wireless network to which tracing system 100 is able to connect (utilizing its network interface 110).

Tracing system 100 further comprises a processing circuitry 130. Processing circuitry 130 can be one or more processing units (e.g. central processing units), microprocessors, microcontrollers (e.g. microcontroller units (MCUs)) or any other computing devices or modules, including multiple and/or parallel and/or distributed processing units, which are adapted to independently or cooperatively process data for controlling relevant tracing system 100 resources and for enabling operations related to tracing system's 100 resources.

Processing circuitry 130 can comprises one or more of the following modules: a location change tracking module 140, a tracing module 150, a virtual station tracking module 160 and a compliance module 170.

Location change tracking module 140, can be configured to track location change of animal during their processing (optionally in real-time or near-real time), as further detailed herein, inter alia with reference to FIG. 3.

Tracing module 150 is configured to perform a process for tracing animals, as further detailed herein, inter alia with reference to FIG. 4. Tracing module can optionally be configured to perform a process for dealing with incomplete sets of animal identifiers, as further detailed herein, inter alia with reference to FIG. 9.

Virtual station tracking module 160 is configured to perform a process for tracking visits of animals at virtual stations, as further detailed herein, inter alia with reference to FIG. 7.

Compliance module 170 is configured to perform one or more processes for checking compliance of animals with various compliance requirements, as further detailed herein, inter alia with reference to FIGS. 5, 6 and 8. Some exemplary compliance requirements include: number of days in quarantine, getting a vaccine/medication, getting a vaccine/medication within a certain period of time from a triggering event, group size, average number of individual animals meeting certain criteria, animal weight thresholds, etc.

Turning to FIG. 3, there is shown a flowchart illustrating one example of a sequence of operations carried out for tracking location changes of animals, in accordance with the presently disclosed subject matter.

In accordance with the presently disclosed subject matter, tracing system 100 can be configured to perform location change tracking process 200 (optionally in real-time or near-real time), e.g. using location change tracking module 140. For this purpose, tracing system 100 is configured to obtain a reading of an identification device attached to, and uniquely identifying, a given member of an animal population to be tracked, the reading acquired by an identification device reader located at a respective given location (being a distinct physically separate location, distinct and physically separate from other locations) (block 210). It is to be noted that, as indicated herein, in some cases the animal can be identified using other identification systems and/or methods that enable uniquely identifying the animals of the animal population.

Upon obtaining the reading at block 210, tracing system 100 inserts a location change record to the data repository 120, indicating that the given member arrived at, or departed from, the given location (block 220). The location change record includes an indication of an arrival time of the given member to the given location or the departure time of the given member from the given location, thereby enabling tracing the members throughout the process. It is to be noted that the reading time, indicative of the arrival/departure time of the animal to/from the given location, can accompany the reading obtained at block 210, optionally along with additional information.

As indicated herein, with reference to FIG. 1, each animal is identified at least once in each location in which it is required to pass as part of its processing. The animal can be identified (a) upon arrival at a given location in which it is to be processed (according to a processing need thereof), or (b) upon exiting the given location in which it is to be processed. In some cases, the animal is identified both upon arrival to the given location in which it is to be processed and upon exiting the given location in which it is to be processed, and in further embodiments, the animal may be identified during its stay in a given location.

Accordingly, in certain embodiments, when an animal arrives at the given location, it is identified (e.g. using an entry reader associated with the given location), and a location change record can be generated, indicating that the animal arrived at the given location, and indicating its arrival time at the given location. Similarly, when an animal exits the given location, it is identified (e.g. using an exit reader associated with the given location), and a location change record can be generated, indicating that the animal exited the given location and indicating its exit time from the location.

It is to be noted that in some cases an animal is identified only once in one or more of the locations in which it is processed, and in such cases, a single location change record is stored indicating that it passed through the given location at a given passage time in which it was identified by the respective reader.

It is to be noted, with reference to FIG. 3, that some of the blocks can be integrated into a consolidated block or can be broken down to a few blocks and/or other blocks may be added. It should be also noted that whilst the flow diagram is described also with reference to the system elements that realizes them, this is by no means binding, and the blocks can be performed by elements other than those described herein.

Attention is now drawn to FIG. 4, a flowchart illustrating one example of a sequence of operations carried out for tracing animals, in accordance with the presently disclosed subject matter.

In accordance with the presently disclosed subject matter, tracing system 100 can be configured to perform an animal tracing process 300 (optionally in real-time or near-real time), e.g. using tracing module 150. For this purpose, tracing system 100 is configured to obtain a population indication request, requesting indications of members of the tracked animal population that meet a criterion (block 310) and to analyze the data repository to identify the members that meet the criterion (block 320).

The information of the location changes of the animals in the animal population as obtained by the location change tracking process 200 enables tracking animal progress throughout the animal processing, as well as tracking interactions between animals (e.g. by determining which animals were located at a given location and which other animals are also located there at the same time).

The criterion mentioned in block 310 can depend on a location of the members. For example, the criterion can be a location from which the members originate or in which the members passed, at any time, or during a given time window.

Looking at a specific example, a user of the tracing system 100 may be interested in locating all members of the animal population that originate from Location A. In such case, the tracing system 100 will analyze the data repository 120 to identify which members of the animal population started their processing in Location A.

Looking at another example, a user of the tracing system 100 may be interested in locating all members of the animal population that passed through Location C. In such case, the tracing system 100 will analyze the data repository 120 to identify which members of the animal population passed through Location C. In some cases, the user may be interested in locating all members of the animal population that passed through Location C during a certain time period (for example a certain year). In such case, the tracing system 100 will analyze the data repository 120 to identify which members of the animal population passed through Location C during 2020.

Clearly the criterion can be much more granular. For example, a user of the tracing system 100 may be interested in locating all members of the animal population that originate from Location A, passed through Location C, and arrived at Location N during the last ten days. In such case, the tracing system 100 will analyze the data repository 120 to identify which members of the animal population that originate from Location A, passed through Location C, and arrived at Location N during the last ten days. The tracing system 100 can optionally provide an indication as to the current location of such animals, optionally in real-time or near-real-time.

In even more complicated cases, the criterion can also refer to virtual station visits of the members of the animal population determined according to virtual station records (as further detailed with reference to FIG. 7). For example, a user of the tracing system 100 may be interested in identifying all the animals that are currently located at Location N, that passed through Location B and did not pass through virtual station A. For example, assuming that according to regulations that apply at Location N, animals that pass-through Location B (which can be a certain country) must be vaccinated with a specific vaccine. Accordingly, the tracing system 100 has ability to identify those animals that arrived at Location N after passing through Location B and did not receive vaccine within a certain time window since their arrival.

In some cases, the criterion mentioned in block 310 can depend on the location of the members with respect to one or more indicated members of the members. For example, a user of the tracing system 100 may be interested in locating all members of the animal population that have been located with the indicated members (being one or more specific animals identified using their unique identifier).

In a specific example, the indicated members are indicated as being sick or as being directly or indirectly associated with a sick member of the animals (members that have been located with a sick animal in one of the locations, members that have been located with other members that were located with a sick animal in one of the locations, etc.). Clearly, having the ability to identify all members of the animal population that may have been affected by a sick animal is crucial and may prevent a need to terminate an entire animal population. Assuming that a given animal was identified as sick with a viral disease, having information of its locations and the locations of the other members of the animal population enables identifying those animals of the animal population that may have been infected by the sick animal. Infection can be direct (by the given animal directly infecting animals that were located with the sick animal in a given location), or indirect (by the given animal infecting another animal that later infects another animal, and so on).

In some cases, the criterion can be a shipment identifier, identifying a specific shipment of a group of members of the animal population between locations. In such cases, a user of the tracing system 100 may be interested in identifying the locations of all members of the animal population that have been shipped in the shipment identified by the shipment identifier.

Tracing system 100 can be further configured to provide an indication of the members that meet the criterion (block 330). Such indication can be provided via any output device, such as: a display or indication mechanisms attached to the animal population (e.g. each animal may have an indication mechanism, such as a light source, a speaker, etc., and the indication mechanisms of the members that meet the criterion may be activated to identify the members that meet the criteria).

It is to be noted, with reference to FIG. 4, that some of the blocks can be integrated into a consolidated block or can be broken down to a few blocks and/or other blocks may be added. It should be also noted that whilst the flow diagram is described also with reference to the system elements that realizes them, this is by no means binding, and the blocks can be performed by elements other than those described herein.

Attention is drawn to FIG. 5, a flowchart illustrating one example of a sequence of operations carried out for checking compliance of animals with compliance goals, in accordance with the presently disclosed subject matter.

In accordance with the presently disclosed subject matter, tracing system 100 can be configured to perform an animal compliance check process 400, e.g. using compliance module 170. For this purpose, tracing system 100 is configured to obtain a data repository 120 comprising a plurality of location change records associated with a plurality of animals of an animal population (block 410).

Tracing system 100 is further configured to analyze the data repository 120 to identify non-compliant members of the animal population that fail to meet one or more compliance goals (block 420). The compliance goals can include definitions of arrival time goals of arriving at one or more of the locations, departure time goals of departing from one or more of the locations, stay times in one or more of the locations, required passages at one or more of the locations, vaccination/medication requirements (optionally including timing requirements such as getting the vaccination/medication within a certain period of time from a triggering event such as arrival time), health requirements, quarantine requirements (e.g. number of days in quarantine), population size (e.g. number of animals within a population or a sub-group of animals of the animal population), average number of individual animals meeting certain criteria, animal weight thresholds, etc.

Some example of non-compliant members: (a) the arrival time indicated by one or more of the location change records associated with the non-compliant members fails to meet an arrival time criterion (indicating that the non-compliant members failed to arrive at a given location on time), (b) the departure time indicated by one or more of the location change records associated with the non-compliant members fails to meet a departure time criterion (indicating that the non-compliant members failed to depart from a given location on time), (c) a stay time lapsing between the arrival time of any given non-compliant member of the non-compliant members to a given distinct physically separate location of the distinct physically separate locations and the departure time of the given non-compliant member from the given distinct physically separate location as indicated by the location change records associated with non-compliant members fails to meet a stay time criterion (indicating that the non-compliant members over stayed or under stayed at a given location), or (d) the one or more of the location change records associated with the non-compliant members indicate that the non-compliant members skipped one or more of the plurality of physically separate locations (indicating that the non-compliant members did not pass through a given location that they were required to pass through).

In some cases, regulatory requirements define one or more of (a) the arrival time criterion, (b) the departure time criterion, or (c) the stay time criterion. In some cases, the tracing system 100 enables configuring regulatory requirements (e.g. by a user of the system).

It is to be noted that the regulatory requirements can be location specific, so that the regulatory requirements in a first location (a first distinct physically separate location) of a plurality of distinct physically separate locations is different than the regulatory requirements in a second location (a second distinct physically separate location) of the distinct physically separate locations.

In some cases, the regulatory requirements can be determined according to a destination location of the physically separate locations, being a destination location of the animal population. Assuming for example, that a first group of animals of an animal population is designated to a first country, and a second group of animals of the animal population is designated to a second country, the regulatory requirements that the first group of animals are subject to are defined according to a regulator of the first country, whereas the regulatory requirements that the second group of animals are subject to are defined according to a regulator of the second country.

In some cases, the regulatory requirements can be determined according to a type of the animal population. Assuming for example, that a first group of animals of an animal population include cows for slaughter, and a second group of animals of the animal population include dairy cows, the regulatory requirements that the first group of animals are subject to can be different than the regulatory requirements that the second group of animals are subject to.

It is to be noted, with reference to FIG. 5, that some of the blocks can be integrated into a consolidated block or can be broken down to a few blocks and/or other blocks may be added. It should be also noted that whilst the flow diagram is described also with reference to the system elements that realizes them, this is by no means binding, and the blocks can be performed by elements other than those described herein.

FIG. 6 is a flowchart illustrating one example of a sequence of operations carried out for checking compliance of an animal population with compliance goals, in accordance with the presently disclosed subject matter.

In accordance with the presently disclosed subject matter, tracing system 100 can be configured to perform an animal population compliance check process 500, e.g. using compliance module 170. For this purpose, tracing system 100 is configured to obtain a data repository 120 comprising a plurality of location change records associated with a plurality of animals of an animal population (block 510).

Tracing system 100 is further configured to analyze the data repository 120 to check compliance of a subset of the animal population with a population compliance goal (block 520). It is to be noted that compliance can be measured on a group level (e.g. a subset of the animal population that meet a certain criterion (located at a certain location, originate from a certain location, designated to a certain location, etc.), the entire animal population, etc.), instead of, or in addition to, compliance measurements on an individual animal level. In such cases, it is desirable to check if a group of animals of the animal population met compliance goals. For example, a certain compliance goal may indicate that at least 20% of the animal population on Location N are required to be animals that originate from Location A. Tracing system 100 can continuously monitor the animal population in Location A in order to verify that the goal is met. In those cases that the goal is not met—tracing system 100 can be configured, for example, to provide a suitable notification to a user thereof.

It is to be noted, with reference to FIG. 6, that some of the blocks can be integrated into a consolidated block or can be broken down to a few blocks and/or other blocks may be added. It should be also noted that whilst the flow diagram is described also with reference to the system elements that realizes them, this is by no means binding, and the blocks can be performed by elements other than those described herein.

FIG. 7 is a flowchart illustrating one example of a sequence of operations carried out for tracking visits of animals at virtual stations, in accordance with the presently disclosed subject matter.

In accordance with the presently disclosed subject matter, tracing system 100 can be configured to perform an animal virtual stations visits tracking process 600, e.g. using location change tracking module 140. For this purpose, tracing system 100 is configured to obtain a virtual station reading of an identification device attached to, and uniquely identifying a virtual station visiting member of the animal population, visiting the virtual station (block 610). It is to be noted that, as indicated herein, in some cases the animal can be identified using other identification systems and/or methods that enable uniquely identifying the animals of the animal population.

As indicated herein, a virtual station is a station in which all, or some, of the animals are required to pass while staying at a given location. Looking at FIG. 1 for example, Virtual Station A is a station in which all, or some, of the animals that arrive at location N are required to pass as part of their processing. For example, in some cases, any animal that arrives at Location N has to be vaccinated. The vaccination can be provided at Virtual Station A, within Location N, without the need to move the animal to another location for vaccination. In such cases, the animals can be identified by Virtual Station A Reader, which is configured to uniquely identify the animals that that are being processed at Virtual Station A. Virtual Station A Reader can be a manual identification device reader operated by a human operator, such as a veterinarian for example.

Upon each of the animals arriving at, or being processed at, Virtual Station A, it is identified using Virtual Station A reader (e.g. by reading an ID tag attached to the animals, or using a visual identification, or using any other system and/or identification method).

Tracing system 100 is further configured to insert a virtual station record to the data repository, indicating that the virtual station visiting member visited the virtual station (block 620). The virtual station record can include an indication of a time of visit of the respective animal at the virtual station thereby enabling tracing animal visits at the virtual stations. It is to be noted that the reading time, indicative of the visit time of the animal at the virtual station, can accompany the reading obtained at block 610, optionally along with additional information.

In some cases, the virtual station can be a treatment station (e.g. a station in which animals gets: vaccinated, medicated, x-rayed, scanned, inseminated, or gets any vet operation, nutritionist operation, farmer operation, regulatory operation, or commercial operation). In such cases, the virtual station visiting member (the animal that visits the virtual station) receives treatment at the treatment station, and the virtual station record indicates that the treatment receiving member received the treatment. In such cases, the virtual station reading can be obtained by a treatment provider (e.g. a veterinarian) located at the treatment station. In some cases, the virtual station reading can be obtained by a treatment provider using a manual identification device reader capable of identifying the animal receiving the treatment (e.g. by reading an identification tag attached thereto, or in any other manner).

It is to be noted, with reference to FIG. 7, that some of the blocks can be integrated into a consolidated block or can be broken down to a few blocks and/or other blocks may be added. It should be also noted that whilst the flow diagram is described also with reference to the system elements that realizes them, this is by no means binding, and the blocks can be performed by elements other than those described herein.

FIG. 8 is a flowchart illustrating one example of a sequence of operations carried out for checking compliance of animals with virtual stations compliance goals, in accordance with the presently disclosed subject matter.

In accordance with the presently disclosed subject matter, tracing system 100 can be configured to perform an animal virtual station compliance process 700, e.g. using compliance module 170. For this purpose, tracing system 100 is configured to obtain a data repository 120 comprising a plurality of virtual station records associated with a plurality of animals of an animal population (block 710).

Tracing system 100 is further configured to analyze the data repository 120 to identify non-treated members of the animal population, being the members that did not receive the treatment at the treatment station (block 720). As indicated herein, a virtual station can be a treatment station. In such cases, the virtual station records that have been acquired via process 600, can be used in order to identify animals of the animal population that did not receive treatment at a treatment station.

It is to be noted that in some cases, the non-treated members are the members of the animal population that did not receive the treatment at the treatment station at required times (e.g. before moving to a subsequent location (e.g. a subsequent physically separate location of a plurality of physically separate locations) subsequent to the treatment station).

In some cases, tracing system 100 can be further configured to analyze the data repository 120 to identify the members that have been located at one or more of the physically separate locations with any of the non-treated members. In some cases, tracing system 100 can be further configured to provide a suitable notification enabling identification of such non-treated members to a user thereof.

Tracing system 100 can be further configured to analyze the data repository 120 to check compliance of a subset of the animal population with a population compliance goal associated with the treatment. It is to be noted that compliance can be measured on a group level, instead of, or in addition to, compliance measurements on an individual animal level. In such cases, it is desirable to check if a group of animals of the animal population met compliance goals. For example, a certain compliance goal may indicate that at least 75% of the animals that arrive at Location N must be vaccinated within 5 hours of arrival to Location N. Tracing system 100 can continuously monitor the animal population in Location N in order to verify that the goal is met. In those cases that the goal is not met—tracing system 100 can be configured, for example, to provide a suitable notification to a user thereof.

It is to be noted, with reference to FIG. 8, that some of the blocks can be integrated into a consolidated block or can be broken down to a few blocks and/or other blocks may be added. It should be also noted that whilst the flow diagram is described also with reference to the system elements that realizes them, this is by no means binding, and the blocks can be performed by elements other than those described herein.

Turning to FIG. 9, there is shown a flowchart illustrating one example of a sequence of operations carried out for dealing with incomplete sets of animal identifiers, in accordance with the presently disclosed subject matter.

In accordance with the presently disclosed subject matter, tracing system 100 can be configured to perform a tracing miss resolution process 800, e.g. using tracing module 150.

The process described herein takes advantage of the fact that in many cases the animals are moved between the locations together, in groups called mobs. in some cases, these mobs will remain together for their entire life, or large parts of it (assuming that no animals of the mob are removed therefrom for some reason, such as injury, death, sale, or any other reason due to which an animal, or a group of animals, is removed from its mob). The fact that the animals are sometimes in mobs for parts of their life can be used in order to resolve misses in animal identifications as the mob is moved between different locations.

On top of the fact that mobs can move between the locations together as indicated herein, in many cases the animals in the mob are identified by an identification device (such as an EID tag), and the identification devices that are assigned to the animals of the mob are associated with sequential identifiers. As shown in the following example of identifiers associated with identification devices attached to a mob of twenty animals, the identifiers are sequential integers:

| Identifier |
|---|
| 982000000000001 |
| 982000000000002 |
| 982000000000003 |
| 982000000000004 |
| 982000000000005 |
| 982000000000006 |
| 982000000000007 |
| 982000000000008 |
| 982000000000009 |
| 982000000000010 |
| 982000000000011 |
| 982000000000012 |
| 982000000000013 |
| 982000000000014 |
| 982000000000015 |
| 982000000000016 |
| 982000000000017 |
| 982000000000018 |
| 982000000000019 |
| 982000000000020 |

It is to be noted that in some cases the identifiers can include non-numeral characters, but in many cases the non-numeral characters are common to all identification devices, and the identifiers of each identification device are differentiated by a part of the identifier that is numeral and sequential. Additionally, or alternatively, the identifiers can be in a hexadecimal format, in a binary format, or in any other format that can enable describing a sequence of immediately following identifiers.

Based on the knowledge that the mob includes twenty animals that are identified by sequential identifiers, the tracing miss resolution process 800 can include making assumptions about missing, or erroneous readings of EID tags associated with a group of members forming the mob. For this purpose, tracing system 100 is configured to obtain a plurality of sets of identifiers of the members of the mob (block 810). Each of the sets is obtained by readings of identification devices (such as EID tags) of the animals forming the mob. As indicated herein, each identification device of the identification devices is attached to, and uniquely identifies, a respective member of the mob. The identifiers in each set of the sets are read (i) at a respective given physically separate location of a plurality of physically separate locations between which the mob is moved in a given order as part of a process, (ii) by a respective given identification device reader of a plurality of identification device readers, each being located at a respective physically separate location of the physically separate locations.

As indicated herein, in some cases not all animals of the mob are successfully scanned at each scanning point (i.e. at each of the plurality of physically separate locations between which the mob is moved in a given order as part of a process). This may be caused by various reasons, including, for example, misplacement of the ID device attached to some of the animals, inability to differentiate between a plurality of ID devices that are scanned simultaneously (e.g. more than one animal simultaneously passes through a gate in which an identification device reader is located), mal-function of the ID device attached to one or more animals, malfunction of an identification device reader, human error (e.g. a human operator of a manual identification device reader fails to read an ID device attached to one or more animals), etc.

As a result, some of the sets that are obtained at block 810 are partial sets that do not include one or more respective missing identifiers of at least one member of the mob. Tracing system 100 is configured to add the missing iden-tifiers to the respective partial sets along with a confidence score indicating a level of confidence that the group of members associated with the missing identifiers were located at the respective physically separate location asso-ciated with the respective partial sets (block 820).

In some cases, the missing identifiers are added to the respective partial lists if the missing identifiers meet a missing identifiers addition rule. In some cases, the missing identifiers addition rule is that at least one of an immediately preceding identifier, preceding the respective missing iden-tifiers, or an immediately subsequent identifier, subsequent to the respective missing identifiers, is included in the respective partial list (so that if identifier X is missing from the partial list, it will be added only if at least one of identifier X−1 or identifier X+1 are included in the partial list).

The confidence score can be represented by a percentage indicating a level of confidence in the correctness of the assumption that the missing identifier should have been read by the identification device reader that read the partial set. Alternatively, the confidence score can be represented in any other manner that can enable determining a level of confi-dence in the correctness of the assumption.

In some cases, for each animal, a single field can be used in order to indicate a level of confidence that the animal passed in each physically distinct location along the process. For example, a binary number can be used, in which the value "1" is assigned to a physically distinct location in which the animal's identification device was successfully read, and the value "0" is assigned to a physical distinct location in which the animal's identification device wasn't successfully read. For instance, the value in such field can be a binary number such as "101" indicating that three attempts to read the animal's identification device have been made, the first and third, represented by the value "1", were successful but the one in the middle, represented by the value "0", failed. Another example could be a non-binary field in which a successful identification device reading is indicated by a certain predetermined value (e.g. "1"), and a non-successful identification device reading is indicated by a level of confidence that the animal was located in the respective physically distinct location although the identifi-cation device reading in such location filed. Such a field can have an exemplary value of "151", indicating that three scans were made, again with the middle scan missing but this time the value "5" that is associated with the missing scan in the middle in this case indicates a 50% confidence. It is to be noted that these are merely examples and the level of confidence in assumptions can be represented in other manners as well, mutatis mutandis.

Turning back to the example in which twenty identifica-tion devices that are associated with sequential identifiers are attached to twenty members of a mob at a given farm, at a certain point in time the mob may be transferred to a different location, such as a saleyard. At the time the mob exits the farm an attempt is made to read the identification devices of the members of the mob and only eighteen identification devices are read successfully, while two iden-tification devices, that are associated with identifiers "982000000000006" and "982000000000016" are not suc-cessfully read. Because we already know the farmer brought twenty identification devices and the sequential identifiers associated with these identification devices, an assumption of what the missing tags could be is made and confidence level is added to that assumption. At this stage in the example, a 50% confidence level is applied. The assumption being that due to the fact that eighteen identification devices have been successfully read, and that the mob is moved together, the missing identification devices are not read by mistake. This is an assumption that may be erroneous, and therefore the confidence score is determined to be 50% and not higher in the example.

It is to be noted that although in the example a 50% confidence score is applied to the assumptions, this is a mere example and other values can be applied to indicate the level of confidence, whether in percentage (e.g. any value between 1% to 99%, between 10% to 90%, between 20% to 80%, between 30% to 70%, between 40% to 60%, between 45% to 55%, etc.), in another numeral representation (e.g. a value between 1-9, 2-8, 3-7, 4-6, etc.), in a textual repre-sentation (e.g. "low confidence", "medium confidence" or the like), or in any other manner.

The assumptions that are made can in some cases later on be verified and/or revised. For example, when an identifi-cation device that wasn't successfully read at a given location is later successfully read by another identification device reader along with other members of the same mob, the assumption may be verified and/or the confidence level of the assumption may be increased. In such case, the confidence score can be increased to indicate a higher assumed confidence than initially determined. In some cases, it can be assigned with a value that indicates that the assumption is validated however it is still a valid assumption and not a result of a successful reading (so that if use is made of percentage for example, the value is optionally not increased to 100% but to another predetermined value that indicates a validated assumption, such as 99%, 98%, 97%, or another pre-determined value). Put in other words, upon a given set of identifiers of the mob including one or more missing identifiers, missing from a previously acquired set of identifiers of the mob, the confidence score associated with given missing identifiers can be increased to indicate that the assumption was validated.

Turning back to the example, upon arrival of the mob to the saleyard another attempt is made to read the animals identification devices by an identification device reader located at the saleyard. At this point, nineteen identification devices are read successfully, while a single identification device, that is associated with identifier "982000000000015" is not successfully read. However, at this reading point, the two identification devices that weren't successfully read upon exit from the farm (namely the identification devices that are associated with identifiers "982000000000006" and "982000000000016") are successfully read. This indicates that the assumption that those identification devices weren't read by mistake upon exiting the farm to the saleyard was correct. Therefore, the confidence score that is associated with the readings of those identification devices upon leaving the farm can be updated to indicate that the assumption is validated. In some cases, the confidence score can be increased to a value indicative of maximal assumed confidence. The value indicative of maximal assumed confidence can be 100%, however in other cases it can be another predetermined percentage that can be close to 100%, such as 99%, 98%, 97% or the like, in order to indicate that the identification devices weren't actually read at these physically separate location (as if they would have been read the confidence score would be 100%). It is to be noted that when the confidence score is represented by another representation (not percentage), the same principles apply, so that if the confidence score is textual, it can be updated to indicate "validated assumption" for example.

It is to be noted that although in the example the value indicative of maximal assumed confidence is represented in percentage (e.g. 99%, 98%, 97%, etc.), it can also be represented by another numeral representation (e.g. the value "8", "9", etc.), or by a textual representation (e.g. "maximal assumed confidence" or the like), or in any other manner.

In some cases, the confidence score assigned to an assumed identification device reading can depend on a number of successful past readings of the missing identification devices prior to reading the respective partial set, so that the larger the number of successful past readings the higher the confidence score is (optionally up to a certain maximal level), as further detailed herein with reference to the example provided below.

Turning back to the example, due to the fact that all identification devices aside from the identification device that is associated with identifier "982000000000015" were successfully read (including the identification devices that are associated with identifiers "982000000000014" and "982000000000016"), it can be assumed that the missing identification device wasn't read by mistake. Therefore, an assumption is made that the animal that is associated with the identification device that is associated with identifier "982000000000015" also arrived to the saleyard. The confidence level assigned to such assumption can be 50% for example, however due to the fact that the identification device of that animal was read in two prior locations (when it was initially attached to the animal and when the animal left the farm to the saleyard), a higher confidence level can be assigned, such as 75% for example (as the confidence level can be dependent on the number of past readings of the missing identifiers prior to reading the respective partial set, so that the larger the number of past readings the higher the confidence score is). More generally, if no successful past readings of the missing identifiers prior to reading the respective partial set exist, the confidence score can be set to X, if one successful past readings of the missing identifiers prior to reading the respective partial set exist, the confidence score can be set to X1 which is greater than X, if two successful past readings of the missing identifiers prior to reading the respective partial set exist, the confidence score can be set to X2 which is greater than X1, and so on, optionally up to a certain maximal value of the confidence score (such as a value between 51% and 99%, between 55% and 95%, between 60% and 90%, between 70% and 80%, etc.).

It is to be noted that although in the example the confidence score's values are represented in percentages (e.g. a value between 51% and 99%, between 55% and 95%, between 60% and 90%, between 70% and 80%, etc.), it can also be represented by another numeral representation (e.g. the value "6", "7", "8", "9", etc.), or by a textual representation (e.g. a text indicating the number of successful past readings of the missing identifiers prior to reading the respective partial set), or in any other manner.

It is to be noted that the relationship between the confidence score and the number of successful past readings of the missing identification devices prior to reading the respective partial set can be linear, however the relationship can also be of another type. For example, in some cases, when a certain number of successful past readings of the missing identification devices prior to reading the respective partial set is above a certain threshold, the confidence score can be updated to a set value.

In some cases, an assumption can be erroneous. For example, in some cases, an animal can be extracted from a mob for various reasons and in such cases, making an assumption that such animal is still part of the mob in readings in which its identification device wasn't actually read is erroneous. However, such erroneous assumptions may be corrected when the respective animals are identified at other location, not with their original mob. For example, an assumption can be made that the animal whose identifier wasn't successfully read at a certain physically distinct location in which its mob passed also passed at such physically distinct location. However, a certain time after making this assumption, the identification device of the same animal is successfully read at another location, separate from its original mob. In such cases, the tracing system 100 can correct the erroneous assumption, optionally by updating the confidence score of the assumed scan to zero or deleting the assumption altogether.

As indicated herein, whenever an animal identification device is read at a certain location, additional data is stored on the data repository 120, which can include, for example, a date/time stamp of the reading, an indication of the location of the identification device reading (e.g. GPS coordinates or any other information that can enable identifying the location in which the identification device reading was made), an identifier of the mob itself (which can be obtained by a user of the system inputting it manually or scanning a code such as a QR code which is indicative of the mob's identifier, etc.), etc. In some cases, such additional data can also be used in order to make various assumptions about the movements of the animals and/or about the mobs or the association of animals to their respective mobs. For instance, if identification devices of a first mob were scanned by a certain identification device reader at 7 am (or between 6:55 am to 7:05 am) and then the same identification device reader (that was used to read the identification device reader of the first mob) is used again at 2 pm (or between 1:55 pm to 2:05 pm) to scan a second mob, the tag data alone may cause a grouping of the two mobs together, even in case the identification device reader operator failed to start a new session to record the mobs separately. In such cases, the date/time stamp of the identification device readings can be used to differentiate between mobs.

It is to be noted, with reference to FIG. 9, that some of the blocks can be integrated into a consolidated block or can be broken down to a few blocks and/or other blocks may be added. It should be also noted that whilst the flow diagram is described also with reference to the system elements that realizes them, this is by no means binding, and the blocks can be performed by elements other than those described herein.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter can be implemented, at least partly, as a suitably programmed computer. Likewise, the presently disclosed subject matter contemplates a computer program being readable by a computer for executing the disclosed methods. The presently disclosed subject matter further contemplates a machine-readable memory tangibly embodying a program of instructions executable by the machine for executing the disclosed methods.

The invention claimed is:

1. A system for tracing a group of members of an animal population throughout a process including moving the group of members between a plurality of physically separate locations in a given order, the system comprising a processing circuitry configured to:

obtain a plurality of sets of identifiers of the group of members, each of the sets obtained by readings of identification devices, wherein (a) each identification device of the identification devices is attached to, and uniquely identifies, a respective member of the group of members, (b) the identifiers in each set of the sets are read (i) at a respective given physically separate location of the physically separate locations, (ii) by a respective given identification device reader of a plurality of identification device readers each being located at a respective physically separate location of the physically separate locations; (c) one or more partial sets of the sets do not include one or more missing identifiers of at least one member of the group of members; and add the missing identifiers to the respective partial sets along with a confidence score indicating a level of confidence that the group of members associated with the missing identifiers were located at the respective physically separate location associated with the respective partial sets.

2. The system of claim 1, wherein the identifiers of the group of members are sequential and wherein the missing identifiers are added to the respective partial lists if the missing identifiers meet a missing identifiers addition rule.

3. The system of claim 2, wherein the missing identifiers addition rule is that at least one of an immediately preceding identifier, preceding the respective missing identifiers, or an immediately subsequent identifier, subsequent to the respective missing identifiers, is included in the respective partial list.

4. The system of claim 1, wherein the confidence score is associated with a number of past readings of the missing identifiers prior to reading the respective partial set, so that the larger the number of past readings the higher the confidence score is.

5. The system of claim 1, wherein upon a given set of the sets including one or more given missing identifiers of the missing identifiers, missing from another set of the sets that is acquired at a given physically separate location of the physically separate locations that is located before the physically separate location of the physically separate locations in which the given set was obtained in accordance with the given order, the confidence score associated with given missing identifiers is increased to indicate maximal assumed confidence.

6. The system of claim 1, wherein at least two of the physically separate locations are located at distinct geographical locations.

7. The system of claim 1, wherein the identification devices are Electronic Identification Devices (EIDs).

8. A method for tracing a group of members of an animal population throughout a process including moving the group of members between a plurality of physically separate locations in a given order, the method comprising:

obtaining, by a processing circuitry, a plurality of sets of identifiers of the group of members, each of the sets obtained by readings of identification devices, wherein (a) each identification device of the identification devices is attached to, and uniquely identifies, a respective member of the group of members, (b) the identifiers in each set of the sets are read (i) at a respective given physically separate location of the physically separate locations, (ii) by a respective given identification device reader of a plurality of identification device readers each being located at a respective physically separate location of the physically separate locations; (c) one or more partial sets of the sets do not include one or more missing identifiers of at least one member of the group of members; and adding, by the processing circuitry, the missing identifiers to the respective partial sets along with a confidence score indicating a level of confidence that the group of members associated with the missing identifiers were located at the respective physically separate location associated with the respective partial sets.

9. The method of claim 8, wherein the identifiers of the group of members are sequential and wherein the missing identifiers are added to the respective partial lists if the missing identifiers meet a missing identifiers addition rule.

10. The method of claim 9, wherein the missing identifiers addition rule is that at least one of an immediately preceding identifier, preceding the respective missing identifiers, or an immediately subsequent identifier, subsequent to the respective missing identifiers, is included in the respective partial list.

11. The method of claim 8, wherein the confidence score is associated with a number of past readings of the missing identifiers prior to reading the respective partial set, so that the larger the number of past readings the higher the confidence score is.

12. The method of claim 8, wherein upon a given set of the sets including one or more given missing identifiers of the missing identifiers, missing from another set of the sets that is acquired at a given physically separate location of the physically separate locations that is located before the physically separate location of the physically separate locations in which the given set was obtained in accordance with the given order, the confidence score associated with given missing identifiers is increased to indicate maximal assumed confidence.

13. The method of claim 8, wherein at least two of the physically separate locations are located at distinct geographical locations.

14. The method of claim 8, wherein the identification devices are Electronic Identification Devices (EIDs).

15. A non-transitory computer readable storage medium having computer readable program code embodied therewith, the computer readable program code, executable by at least one processing circuitry of a computer to perform a method for tracing a group of members of an animal population throughout a process including moving the group of members between a plurality of physically separate locations in a given order, the method comprising:

obtaining, by a processing circuitry, a plurality of sets of identifiers of the group of members, each of the sets obtained by readings of identification devices, wherein (a) each identification device of the identification devices is attached to, and uniquely identifies, a respective member of the group of members, (b) the identifiers in each set of the sets are read (i) at a respective given physically separate location of the physically separate locations, (ii) by a respective given identification device reader of a plurality of identification device readers each being located at a respective physically separate location of the physically separate locations; (c) one or more partial sets of the sets do not include one or more missing identifiers of at least one member of the group of members; and adding, by the processing circuitry, the missing identifiers to the respective partial sets along with a confidence score indicating a level of confidence that the group of members associated with the missing identifiers were located at the respective physically separate location associated with the respective partial sets.

*    *    *    *    *